Patented Oct. 28, 1952

2,615,893

UNITED STATES PATENT OFFICE 2,615,893

PREPARATION OF THIOCARBAMYL THIAZYL MONOSULFIDES

Albert F. Hardman, Akron, Ohio, assignor to Wingfoot Corporation, Akron, Ohio, a corporation of Delaware No Drawing. Application May 6, 1950, Serial No. 160,592

13 Claims. (Cl. 260—293.4)

This invention relates to a new method for the preparation of thiocarbamyl thiazyl monosulfides, a class of compounds which are useful as accelerators in the vulcanization of rubber.

The thiocarbamyl thiazyl monosulfides have been prepared in the past by reacting, for example, a 2-halogen benzothiazole with an alkali salt of a dialkyl dithiocarbamate. These reactions were slow and had to be carried out under pressure since the halogen of the 2-halogen benzothiazole is not very labile.

It is an object of this invention to provide a method for the preparation of thiocarbamyl thiazyl monosulfides which may be carried out at atmospheric pressure. Another object is to provide a method for the preparation of these compounds requiring a relatively short reaction time. Still another object is to provide a method for preparing thiocarbamyl thiazyl monosulfides in high yields and in a high degree of purity. Another object is to provide an efficient, inexpensive method for the production of thiocarbamyl thiazyl monosulfides. Further objects will appear as the description proceeds.

According to the practice of this invention, a thiuram disulfide is reacted with a dithiazyl disulfide in the presence of an alkali metal cyanide to form the thiocarbamyl thiazyl monosulfide and the alkali metal thiocyanate. The reaction is thought to take place according to the following equation:

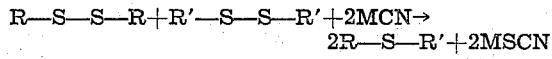

where R represents a thiazyl radical, R' represents a thiocarbamyl radical and M represents an alkali metal radical.

The method of preparation to which this invention relates embraces the reaction of a member of the class of dithiazyl disulfides with a member of the class of thiuram disulfides. Examples of the dithiazyl compounds which may be used in the practice of this invention are dibenzothiazyl disulfide, the substituted benzothiazyls such as 6-nitro-benzothiazyl disulfide, 5-chloro-benzothiazyl disulfide, and 6-chloro-benzothiazyl disulfide, the alkyl thiazyls such as 4,5-dimethyl thiazyl disulfide and 4-ethyl thiazyl disulfide, and naphthothiazyl disulfide. The thiuram disulfides to which this method of preparation pertains include the tetraalkyl thiuram disulfides such as tetramethyl thiuram disulfide, tetraethyl thiuram disulfide, the tetra-aromatic compounds such as tetraphenyl thiuram disulfide, the tetra-aralkyl compounds such as tetrabenzyl thiuram disulfide, the cycloaliphatic compounds such as tetracyclohexyl thiuram disulfide, and the heterocyclic compounds such as dipiperidyl thiuram disulfide and dimorpholyl thiuram disulfide. Any alkali metal cyanide may be used in the reaction, such as sodium or potassium cyanide. Sodium cyanide is preferred since it is the cheapest of the materials available commercially.

For best results the reaction should take place in solution. The reaction has been found to work in a water solution, although an organic solvent is preferred since by providing a reacting medium which dissolves but does not chemically affect the reactants, it is possible to obtain a more intimate mixture with resultant higher conversions and higher yields. The solvent used may be any inert solvent, by which term is meant any solvent for the reacting materials which will not enter into nor chemically affect the reaction. Examples of such solvents are methyl alcohol, ethyl alcohol, isopropyl alcohol, ether, dioxane, acetone, and methyl ethyl ketone.

The practice of this invention is further illustrated by the following examples:

Example 1

Tetraethyl thiuram disulfide (15 grams) and 2,2' dibenzothiazyl disulfide (17 grams) were mixed into 50 cubic centimeters of methyl alcohol. To this mixture were added 6.5 grams of potassium cyanide. The mixture immediately became warm and largely went into solution. The mixture was then heated on a steam bath until all reactants were in solution. Upon cooling, 20 grams of white crystals were obtained. These crystals melted at 75 to 77° C., and when recrystallized melted at 79–80° C. Analysis showed a sulfur content of 34.42% and 34.59% and a nitrogen content of 9.66% and 9.77%. The calculated sulfur is 34.0% and nitrogen 9.95%. The formula therefore was assumed to be

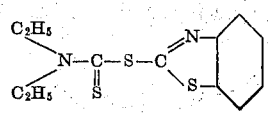

Example 2

Tetraethyl thiuram disulfide (150 grams) and 2,2' dibenzothiazyl disulfide (170 grams) were stirred into 500 cubic centimeters of acetone. To this mixture were added 50 grams of sodium cyanide in 100 cubic centimeters of water, the addition requiring about ten minutes. The temperature of the mixture rose rapidly to 53° C. and then slowly declined. All of the reacting materials were in solution. The mixture was stirred for 5 minutes and then cooled in an ice bath resulting in the formation of crystals. The mixture was diluted with 1000 cubic centimeters of cold water and filtered. The crystals were washed with cold water and air dried. The yield was 270 grams of yellowish-brown, somewhat waxy crystals melting at 70 to 73° C. The yield represented a 95.6% conversion.

*Example 3*

The 2-benzothiazyl dimethyl thiocarbamyl monosulfide was prepared from 2,2' benzothiazyl disulfide and tetramethyl thiuram disulfide according to the same procedure as shown in Example 2. The yield was 91%. The pure recrystallized material melted at 121 to 122° C. An analysis showed a sulfur content of 37.19% and 38.05% and a nitrogen content of 10.68% and 10.75%. Calculated sulfur is 37.80% and nitrogen 11.03%. The formula is therefore assumed to be

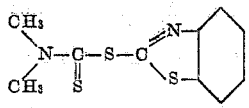

*Example 4*

N,N' diethyl-N,N' dicyanoethyl thiuram disulfide (17 grams) and 2,2' dibenzothiazyl disulfide (17 grams) were stirred into 50 cubic centimeters of acetone. To this mixture were added 13 cubic centimeters of a 33⅓% solution of sodium cyanide by weight in water. After the reacting materials were stirred together and cooled in an ice bath, the solution was filtered, yielding crystals which upon washing with acetone and subsequent drying melted at 113 to 114° C. Analysis showed a sulfur content of 31.82 and 32.12% and a nitrogen content of 13.25 and 13.39%. Calculated sulfur is 31.30% and nitrogen 13.70%. The formula is therefore assumed to be

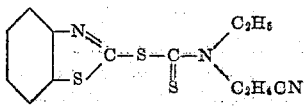

*Example 5*

N,N' dimethyl-N,N' diisopropyl thiuram disulfide (60 grams) and 2,2' dibenzothiazyl disulfide (70 grams) were stirred into 160 cubic centimeters of acetone. To this mixture were added 60 cubic centimeters of a 33⅓% solution of sodium cyanide by weight in water. Upon cooling, crystals were obtained which when washed and dried melted at 120 to 121° C. Analysis showed a sulfur content of 33.74 and 33.58% and a nitrogen content of 9.85 and 9.82%. Calculated sulfur is 34.00% and nitrogen 9.95%. The formula was therefore assumed to be

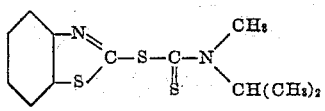

*Example 6*

6,6'-dinitro benzothiazyl disulfide (22 grams) and tetraethyl thiuram disulfide (15 grams) were stirred into 50 cubic centimeters of a 33⅓% solution of sodium cyanide by weight in water. In a few minutes crystals formed, which when separated, washed with acetone and dried, melted at 122–123° C. Analysis showed a sulfur content of 28.79 and 28.68% and a nitrogen content of 12.12 and 12.20%. Calculated sulfur is 29.50% and nitrogen 12.85%. The formula therefore was assumed to be

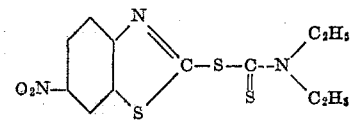

Examples of other thiocarbamyl thiazyl monosulfides which may be made according to the practice of this invention are B-cyanoethyl-ethyl - thiocarbamyl - benzothiazyl-monosulfide, tetra - hydrofurfuryl-cyclohexyl-thiocarbamyl-benzothiazyl-monosulfide, allyl-ethyl-thiocarbamyl-benzothiazyl-monosulfide, N-cyclotetramethylene - thiocarbamyl - benzothiazyl-monosulfide, phenyl - methyl - thiocarbamyl-benzothiazyl - monosulfide, diphenyl-thiocarbamyl-benzothiazyl-monosulfide, diethyl-thiocarbamyl-6 - nitrobenzothiazyl-monosulfide, methyl-isopropyl - thiocarbamyl-benzothiazyl-monosulfide, dimethyl - thiocarbamyl - 4,5 - dimethyl-thiazyl-monosulfide, and dimethyl - thiocarbamyl - 4-ethyl-thiazyl-monosulfide.

While certain representative embodiments and details have been shown for the purpose of illustrating the invention, it will be apparent to those skilled in the art that various changes and modifications may be made therein without departing from the spirit or scope of the invention.

I claim:

1. A method for the preparation of a thiocarbamyl thiazyl monosulfide which comprises reacting a mixture of a thiazyl disulfide and a thiuram disulfide with an alkali metal cyanide.

2. A method for the preparation of a thiocarbamyl benzothiazyl monosulfide which comprises reacting a mixture of a dibenzothiazyl disulfide, and a thiuram disulfide with an alkali metal cyanide.

3. A method for the preparation of a thiocarbamyl benzothiazyl monosulfide which comprises reacting a mixture of dibenzothiazyl disulfide and a tetralkyl thiuram disulfide with an alkali metal cyanide.

4. A method for the preparation of dimethyl-thiocarbamyl benzothiazyl monosulfide which comprises reacting a mixture of dibenzothiazyl disulfide and tetramethyl thiuram disulfide with an alkali metal cyanide.

5. A method for the preparation of diethyl-thiocarbamyl benzothiazyl monosulfide which comprises reacting a mixture of dibenzothiazyl disulfide and tetraethyl thiuram disulfide with an alkali metal cyanide.

6. A method for the preparation of piperidyl-thiocarbamyl benzothiazyl monosulfide which comprises reacting a mixture of dibenzothiazyl disulfide and dipiperidyl thiuram disulfide with an alkali metal cyanide.

7. A method for the preparation of dimethyl-thiocarbamyl benzothiazyl monosulfide which comprises reacting a mixture of dibenzothiazyl disulfide and tetramethyl thiuram disulfide with sodium cyanide.

8. A method for the preparation of diethyl-thiocarbamyl benzothiazyl monosulfide which comprises reacting a mixture of dibenzothiazyl disulfide and tetraethyl thiuram disulfide with sodium cyanide.

9. A method for the preparation of piperidyl-thiocarbamyl benzothiazyl monosulfide which comprises reacting a mixture of dibenzothiazyl disulfide and dipiperidyl thiuram disulfide with sodium cyanide.

10. A method for the preparation of dimethyl-thiocarbamyl benzothiazyl monosulfide which comprises reacting a mixture of dibenzothiazyl disulfide and tetramethyl thiuram disulfide with sodium cyanide in acetone.

11. A method for the preparation of diethyl-thiocarbamyl benzothiazyl monosulfide which comprises reacting a mixture of dibenzothiazyl disulfide and tetraethyl thiuram disulfide with sodium cyanide in acetone.

12. A method for the preparation of piperidyl-thiocarbamyl benzothiazyl monosulfide which comprises reacting a mixture of dibenzothiazyl disulfide and dipiperidyl thiuram disulfide with sodium cyanide in acetone.

13. A method for the preparation of beta-cyanoethyl-ethyl thiocarbamyl benzothiazyl monosulfide which comprises reacting a mixture of dibenzothiazyl disulfide and N,N'-diethyl-N,N'-dicyanoethyl thiuram disulfide with an alkali metal cyanide.

ALBERT F. HARDMAN.

REFERENCES CITED

The following references are of record in the file of this patent:

UNITED STATES PATENTS

| Number | Name | Date |
|---|---|---|
| 1,682,920 | Maximoff | Sept. 4, 1928 |
| 1,923,957 | Teppema | Aug. 22, 1933 |
| 2,453,460 | Robshaw | Nov. 9, 1948 |
| 2,499,975 | Robshaw | Mar. 7, 1950 |
| 2,510,893 | Kleimann | June 6, 1950 |

OTHER REFERENCES

Foss: Chem. Abstracts, vol. 42 (1948), page 2240.